United States Patent
Han et al.

(10) Patent No.: US 9,525,864 B2
(45) Date of Patent: Dec. 20, 2016

(54) DISPLAY APPARATUS AND MULTI VIEW PROVIDING METHOD THEREOF

(71) Applicant: SAMSUNG ELECTRONICS CO., LTD., Suwon-si (KR)

(72) Inventors: Seung-ryong Han, Yongin-si (KR); Jin-sung Lee, Suwon-si (KR); Ho-young Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 10 days.

(21) Appl. No.: 14/596,801

(22) Filed: Jan. 14, 2015

(65) Prior Publication Data
US 2015/0365659 A1 Dec. 17, 2015

(30) Foreign Application Priority Data
Jun. 11, 2014 (KR) ........................ 10-2014-0070987

(51) Int. Cl.
*H04N 13/04* (2006.01)
*G06F 1/16* (2006.01)

(52) U.S. Cl.
CPC ........ *H04N 13/0409* (2013.01); *G06F 1/1677* (2013.01); *H04N 13/0454* (2013.01)

(58) Field of Classification Search
None
See application file for complete search history.

(56) References Cited

U.S. PATENT DOCUMENTS

| 7,417,664 | B2 | 8/2008 | Tomita | |
| 9,395,751 | B2* | 7/2016 | Li | G06F 1/1615 |
| 2008/0233326 | A1* | 9/2008 | Hegemier | H04M 1/0283 |
| | | | | 428/41.7 |
| 2010/0253768 | A1* | 10/2010 | El-Maraghi | G06F 1/1609 |
| | | | | 348/51 |
| 2010/0279739 | A1* | 11/2010 | Lin | G06F 1/1616 |
| | | | | 455/566 |
| 2011/0084893 | A1* | 4/2011 | Lee | G06F 1/1649 |
| | | | | 345/6 |
| 2011/0117958 | A1* | 5/2011 | Kim | G03B 35/10 |
| | | | | 455/556.1 |
| 2012/0026290 | A1* | 2/2012 | Lim | H04N 13/0239 |
| | | | | 348/46 |
| 2012/0038625 | A1* | 2/2012 | Kim | G06F 3/04815 |
| | | | | 345/419 |
| 2012/0069000 | A1* | 3/2012 | Kim | H04N 13/0033 |
| | | | | 345/419 |

(Continued)

FOREIGN PATENT DOCUMENTS

| JP | 2002-372929 A | 12/2002 |
| KR | 10-2005-0043329 A | 5/2005 |

(Continued)

*Primary Examiner* — Hilina K Demeter
(74) *Attorney, Agent, or Firm* — Sughrue Mion, PLLC

(57) ABSTRACT

Provided herein is a display apparatus including a display; a renderer configured to render a multi-view image; and a controller configured to, in response to a cover being closed, determine an extent by which the closed cover is twisted with respect to the display apparatus, control the renderer to render the multi-view image corresponding to the extent by which the closed cover is twisted, and control the display to display the rendered multi-view image.

16 Claims, 21 Drawing Sheets

(56) References Cited

U.S. PATENT DOCUMENTS

| | | | | |
|---|---|---|---|---|
| 2012/0081361 A1* | 4/2012 | Woo | ............... | H04N 13/0425 |
| | | | | 345/419 |
| 2012/0113105 A1* | 5/2012 | Lee | ............... | G09G 3/003 |
| | | | | 345/419 |
| 2012/0329527 A1* | 12/2012 | Kang | ............... | H04N 13/0059 |
| | | | | 455/566 |
| 2013/0045781 A1* | 2/2013 | Tho | ............... | H04M 1/22 |
| | | | | 455/575.1 |
| 2014/0210803 A1* | 7/2014 | Oh | ............... | G09G 3/20 |
| | | | | 345/207 |
| 2015/0156312 A1* | 6/2015 | Jung | ............... | H04M 1/72575 |
| | | | | 455/566 |

FOREIGN PATENT DOCUMENTS

| KR | 10-0623147 B1 | 9/2006 |
|---|---|---|
| KR | 10-2012-0088609 A | 8/2012 |

* cited by examiner

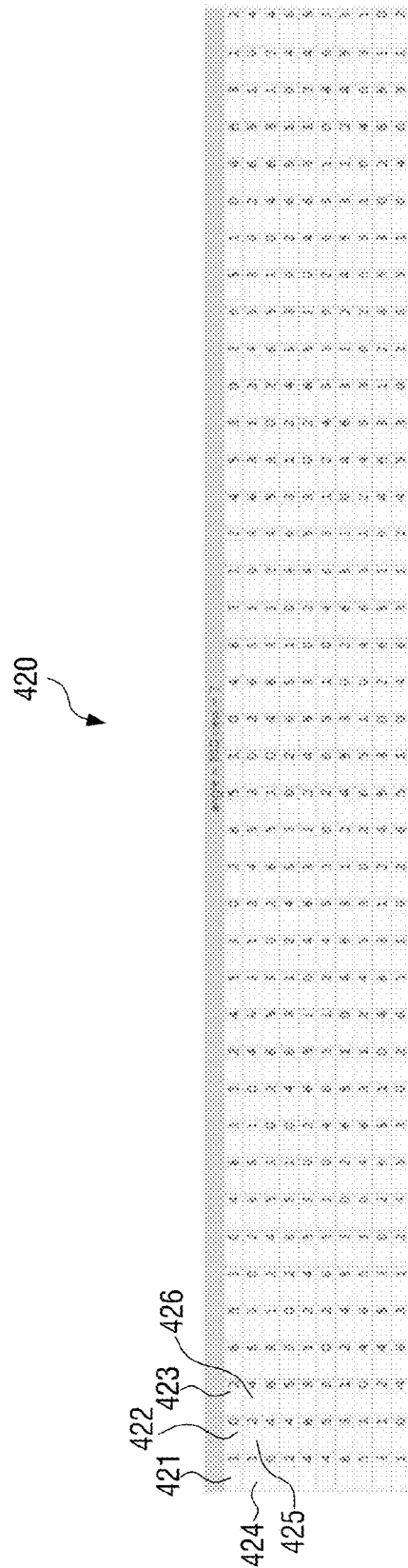

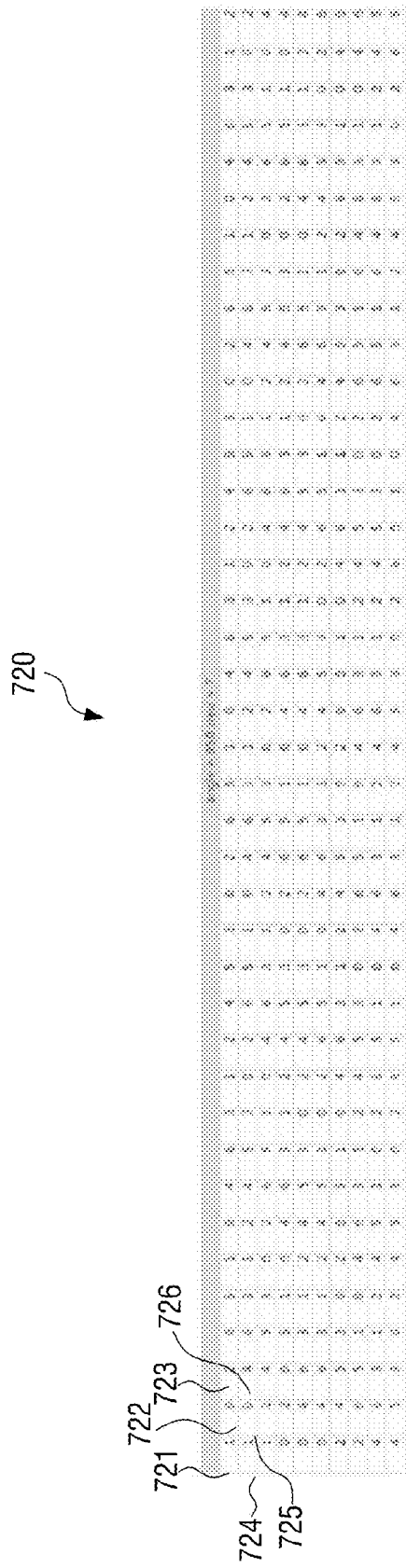

DISPLAY APPARATUS AND MULTI VIEW PROVIDING METHOD THEREOF

CROSS-REFERENCE TO RELATED APPLICATION

This application claims priority from Korean Patent Application No. 10-2014-0070987, filed in the Korean Intellectual Property Office on Jun. 11, 2014, the entire disclosure of which is incorporated herein by reference.

BACKGROUND

1. Field

Methods and apparatuses consistent with the exemplary embodiments relate to a display apparatus and a multi-view image providing method thereof, and more particularly, to a display apparatus capable of providing a multi-view image in a glassesless method, and a multi-view image providing method thereof.

2. Description of Related Art

Recently, efforts are accelerating to develop display apparatuses that may provide stereoscopic images enabling one to view an image with a greater sense of reality. Such display apparatuses may be classified into one of two categories: glasses method display apparatuses, which require glasses to be used for viewing stereoscopic images, and glassesless method display apparatuses, which do not require glasses for viewing stereoscopic images.

A glassesless method display apparatus is configured to display multi-view images, and to cause images taken at different viewpoints to enter one of a left eye and right eye of a user through a lenticular lens or parallax barrier, so that the user may experience a stereoscopic sense.

Users of display apparatuses that are portable, such as cell phones, often use a cover on the display apparatus to prevent it from breaking. Such a cover may have a transparent area, thus providing images to the user through the transparent area, even when the cover is closed.

However, in cases where the cover is made in the shape of a flap, due to the characteristics of the flap, the cover may be closed twisted. Therefore, there is a need for a method to give a stereoscopic sense to the user with the images being displayed through the transparent area even when the cover is closed in a twisted manner.

SUMMARY

One or more exemplary embodiments may resolve the aforementioned problems, and provide a display apparatus capable of providing a stereoscopic view through a cover closed in a twisted manner and a method for providing a multi-view image thereof.

According to an aspect of an exemplary embodiment, there is provided a display apparatus detachable from a cover configured to separate a multi-view image into a plurality of views of different viewpoints, the apparatus including a display; a renderer configured to render the multi-view image; and a controller configured, in response to the cover fitted to the display apparatus being closed, to determine an extent by which the closed cover is twisted with respect to the display apparatus, and to control the renderer to render the multi-view image corresponding to the extent by which the cover is twisted, and to display the rendered multi-view image on the display.

Herein, the controller may determine the extent by which the cover is twisted based on a point on the display touched by a predetermined point of the closed cover, and control the renderer to render the multi-view image corresponding to the extent by which the cover is twisted.

Furthermore, the controller may determine a sub pixel coordinate of the point on the display touched by the predetermined point of the closed cover, calculate a modifying parameter representing an extent of rotation and movement of position of the sub pixel coordinate of the touched point based on a predetermined sub pixel coordinate, and control the renderer to render the multi-view image corresponding to the extent by which the cover is twisted based on the calculated modifying parameter.

Furthermore, the controller may calculate the modifying parameter based on a value calculated based on math formula 1.

Herein, the cover may be provided with a lenticular lens or parallax barrier in a predetermined area, in order to separate the multi-view image into a plurality of images of different viewpoints.

Furthermore, controller may determine the extent by which the cover is twisted at every predetermined time period.

According to an aspect of another exemplary embodiment, there is provided a method for displaying a multi-view image of a display apparatus detachable from a cover configured to separate a multi-view image into a plurality of views of different viewpoints, the method including in response to the cover fitted to the display apparatus being closed, determining an extent by which the closed cover is twisted with respect to the display apparatus and rendering the multi-view image corresponding to the extent by which the cover is twisted; and displaying the rendered multi-view image.

Herein, the rendering may involve determining the extent by which the cover is twisted based on a point on the display apparatus touched by a predetermined point of the closed cover, and rendering the multi-view image corresponding to the extent by which the cover is twisted.

Herein, the rendering may involve determining a sub pixel coordinate of the point on the display touched by the predetermined point of the closed cover, calculating a modifying parameter representing an extent of rotation and movement of position of the sub pixel coordinate of the touched point based on a predetermined sub pixel coordinate, and controlling the renderer to render the multi-view image corresponding to the extent by which the cover is twisted based on the calculated modifying parameter.

Herein, the rendering may involve calculating the modifying parameter based on a value calculated based on math formula 1.

Herein, the cover may be provided with a lenticular lens or parallax barrier in a predetermined area, in order to separate the multi-view image into a plurality of images of different viewpoints.

The method may further include determining the extent by which the cover is twisted at every predetermined time period.

According to various aforementioned embodiments of the present disclosure, a user may be provided with a stereoscopic image through a cover closed in a twisted manner, since the user may be provided with a multi-view image that corresponds to the twisted state.

BRIEF DESCRIPTION OF THE DRAWINGS

The above and/or other exemplary aspects and advantages of the present disclosure will be more apparent by describing certain exemplary embodiments of the present disclosure with reference to the accompanying drawings, in which:

FIGS. 4A and 4B schematically illustrate a multi-view image being rendered according to exemplary embodiments;

FIGS. 7A, 7B, 8A, 8B, 9A, 9B, 10A, 10B, 11A and 11B schematically illustrate multi-view images being rendered according to exemplary embodiments;

DETAILED DESCRIPTION

Figure 1A:
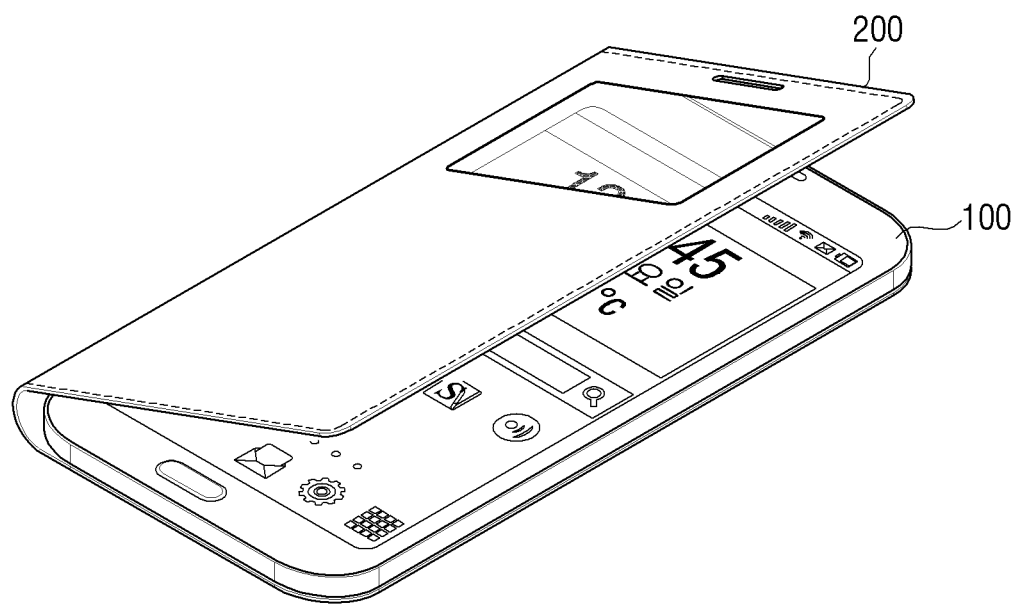
FIGS. 1A, 1B and 1C illustrate a display apparatus and a cover according to an exemplary embodiment.

Hereinafter, terms that are used in the specification will be briefly described, and exemplary embodiments will be described in detail. The drawings may not be to scale, and the relative size, proportions, and depiction of elements in the drawings may be exaggerated for clarity, illustration, and convenience.

The following detailed description is provided to assist the reader in gaining a comprehensive understanding of the methods, apparatuses, and/or systems described herein. However, various changes, modifications, and equivalents of the methods, apparatuses and/or systems described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

Also, when a part "includes" or "comprises" an element, unless there is a particular description contrary thereto, the part can further include other elements, not excluding the other elements. In the following description, terms such as "unit" and "module" indicate a unit for processing at least one function or operation, wherein the unit and the block may be embodied as hardware or software or embodied by combining hardware and software.

As used herein, the term "and/or" includes any and all combinations of one or more of the associated listed items. Expressions such as "at least one of," when preceding a list of elements, should be understood to modify the entire list of elements and not as modifying the individual elements of the list.

One or more exemplary embodiments of the present disclosure will now be described more fully with reference to the accompanying drawings. However, the one or more exemplary embodiments of the present disclosure may be embodied in many different forms, and should not be construed as being limited to the exemplary embodiments set forth herein. Rather, these exemplary embodiments are provided so that this disclosure will be thorough and complete, and will fully convey the concept of the one or more exemplary embodiments of the present disclosure to those of ordinary skill in the art. In the following description, well-known functions or constructions are not described in detail since they would obscure the one or more exemplary embodiments of the present disclosure with unnecessary detail Like reference numerals in the drawings denote like or similar elements throughout the specification.

FIG. 1A is a view illustrating a display apparatus and a cover according to an exemplary embodiment. A display apparatus 100 may be embodied as, but without limitation to, a mobile phone such as a smart phone as illustrated in the attached drawings. In other aspects of various embodiments, the display apparatus 100 may be embodied as any of various types of apparatuses that are portable and have display functions, such as a tablet PC (Personal Computer), Portable Multimedia Player (PMP), Personal Digital Assistant (PDA), e-book, navigational device, and so forth. In such cases, a cover 200 may be embodied in any of various formats depending on the type of the display apparatus 100.

Figure 1B:
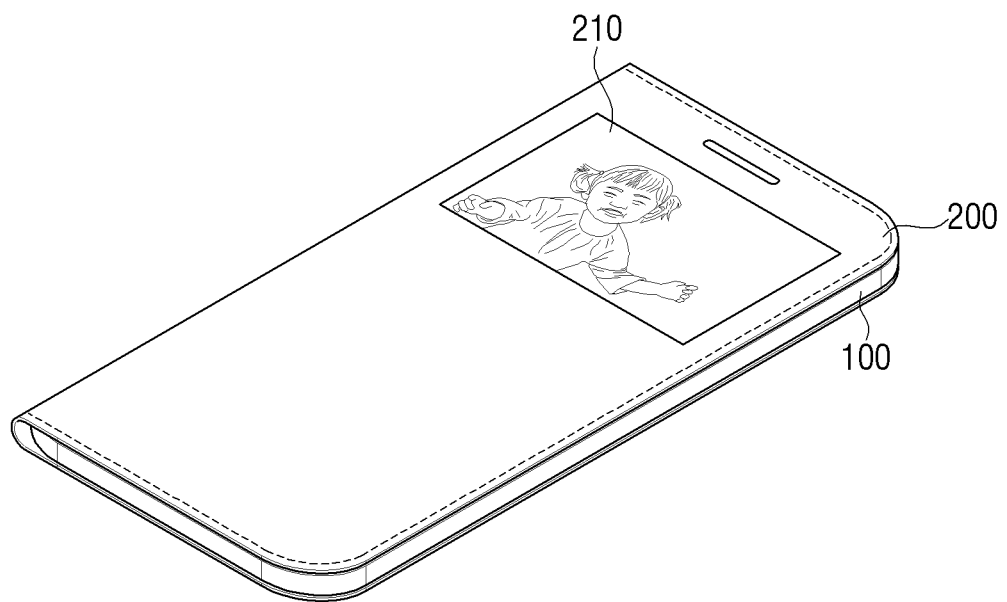

Referring to FIG. 1A, the display apparatus 100 may include a touch screen capable of sensing a touch on a front surface thereof, and the display apparatus 100 may execute various programs depending on a touch input by a touching means, such as a finger etc. FIG. 1B illustrates the display apparatus 100 and the cover 200 in a closed state.

In order to prevent the display apparatus 100 from being damaged due to a scratch or impact while being carried or used, the cover 200 may be fitted to the display apparatus 100. In such a case, the cover 200 may be detachable from the display apparatus 100.

The cover 200 may be a part of a flap-shaped case covering the display apparatus 100, so that a part covering the touch screen may be opened/closed, allowing a user to touch the screen.

In such a case, a part of the cover 200 is may be transparent, allowing various types of screens to be viewed by the user through a transparent area 210 of the cover 200, even when the cover 200 is closed.

For this purpose, the display apparatus 100 may store information on an area of the touch screen to which the transparent area 210 corresponds when the cover 200 is closed, and information on a size of the corresponding area. The display apparatus 100 may display an image on the corresponding area of the touch screen.

The display apparatus 100 may display, on the area corresponding to the transparent area 210, a multi-view image, so that the multi-view image may be viewed by the user through the transparent area 210.

Herein, the term "multi-view image" may refer to a plurality of images of a same object photographed from different viewpoints. For example, a multi-view image may consist of a plurality of images photographed at seven different viewpoints. In such a case, the transparent area 210 may include a stereoscopic image filter such as a lenticular lens or a parallax barrier, and may separate the multi-view image being displayed on the display apparatus 100 into a plurality of images having different viewpoints.

For example, the stereoscopic image filter provided in the transparent area 210 may refract the plurality of images photographed at different viewpoints by different angles or block some of the plurality of images photographed at different viewpoints, and then focus each of the remaining plurality of images at different viewpoints such that they are spaced apart from one another by a certain distance on the display apparatus 100. Herein, an area where a viewpoint image is focused and formed may be called a viewing area, and a view formed on the viewing area may be called an optical view.

Accordingly, when a user's first eye sees one viewing area, one optical view will enter the first eye, and when the user's second eye sees another viewing area, another optical view will enter the second eye. Thus, the user is able to experience the stereoscopic sense created by the image being provided through the transparent area 210.

For example, when the cover 200 is closed, the display apparatus 100 may display a multi-view image consisting of seven viewpoints on an area corresponding to the transparent area 210.

In such a case, each of the seven viewpoints may be refracted by a lenticular lens (not illustrated) by different angles. Thus, an optical view corresponding to a first viewpoint image may be focused on a first viewing area, and an optical view corresponding to a second viewpoint image may be focused on a second viewing area.

Accordingly, when the user's left eye views the first viewing area, and the user's right eye views the second viewing area, the user's left eye and right eye will be viewing different viewpoints, thus the stereoscopic sense may be experienced.

Figure 1C:
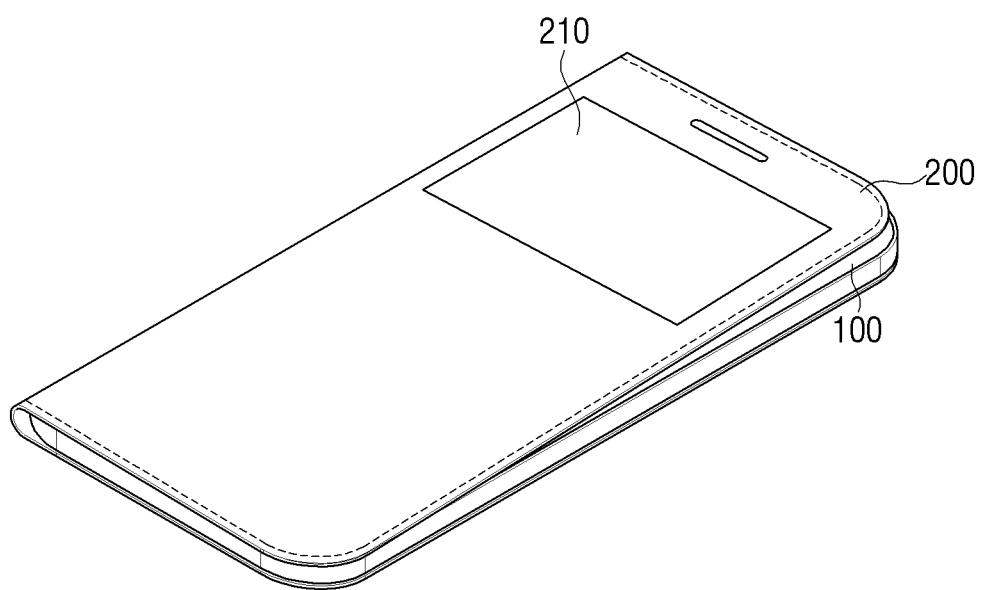

Since the cover 200 may be opened and closed, a part covering a front surface of the display apparatus 100 and a part covering a rear surface of the display apparatus 100 may be connected by a flexible material. Therefore, depending on the connecting part, situations may occur in which the cover 200 is closed and twisted, as illustrated in FIG. 1C.

The transparent area 210 may also be in a twisted state when the cover 200 is closed and twisted. Thus the display apparatus 100 may render a multi-view image corresponding to the region of the display viewable through the twisted transparent cover, and may thereby display the same image when the cover 200 is closed and twisted.

Hereinafter, an exemplary method for rendering a multi-view image will be discussed in further detail with reference to the drawings.

Figure 2:
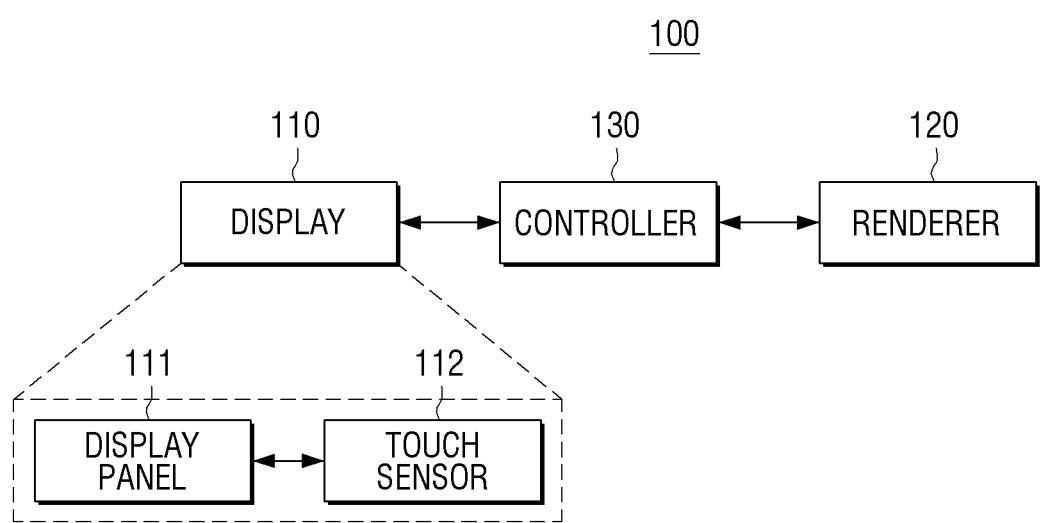
FIG. 2 illustrates a configuration of a display apparatus according to an exemplary embodiment.

FIG. 2 is a block diagram illustrating a configuration of a display apparatus according to an exemplary embodiment. Referring to FIG. 2, the display apparatus 100 may include display 110, renderer 120, and controller 130.

The display 110 may be embodied as a touch screen including a display panel 111 and touch sensor 112.

The display panel 111 may display a multi-view image. Further, the display panel 111 may display the multi-view image on an area on the display 110 corresponding to the transparent area 210 of the cover 200.

The multi-view image may be an image in which a plurality of images of different viewpoints are sequentially and repeatedly arranged.

For this purpose, the display panel 111 may include a plurality of pixels, each consisting of a plurality of sub pixels. A pixel may consist of a R(Red) sub pixel, a G(Green) sub pixel, and a B(Blue) sub pixel.

Figure 3:
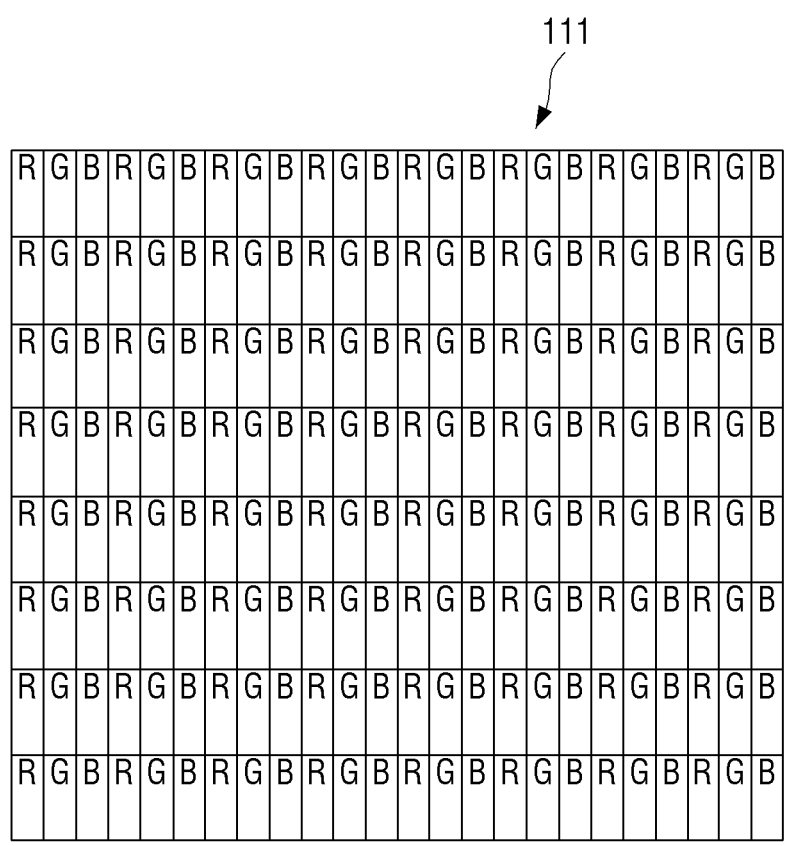
FIG. 3 illustrates a display panel according to an exemplary embodiment.

For example, as illustrated in FIG. 3, the display panel 111 may be in a format where each pixel, consisting of R, G, and B sub pixels, is arranged in one of a plurality of lines, and a plurality of rows. In such a case, sub pixels may be arranged such that an R sub pixel, G sub pixel, and B sub pixel are repeated alternately in a line direction, and that sub pixels of a same color are arranged in a row direction.

The touch sensor 112 may sense a touch on the display 110. In such a case, the touch sensor 112 may be configured to sense a touch using an electrostatic method. Accordingly, the touch sensor 112 may sense a touch by not only a finger, but also by any of various electroconductive materials.

The renderer 120 renders the multi-view image. Specifically, the renderer 120 may render the multi-view image such that a plurality of multi-view images photographed at different viewpoints are displayed on sub pixels in various patterns.

The stereoscopic image filter provided in the transparent area 210 may be formed such that it is tilted by a certain angle with respect to a vertical axis of the display 110, and thus the renderer 120 may render the multi-view image in consideration of the angle by which the stereoscopic image filter is tilted.

For this purpose, the display apparatus 100 may prestore angular information representing the angle by which the stereoscopic image filter is tilted when the cover 200 is closed normally, without any twisting, and information on the multi-view image being displayed on each sub pixel at the corresponding angle. The renderer 120 may use this information to render the multi-view image corresponding to the angle by which the stereoscopic image filter is tilted when the cover 200 is closed normally without any twisting.

For example, when the cover is closed normally without any twisting, and the lenticular lens (not illustrated) provided in the transparent area 210 is tilted by 80°, a lens width of each lenticular lens (not illustrated) may be formed to have a width of 4.6 sub pixel.

Figure 4A:
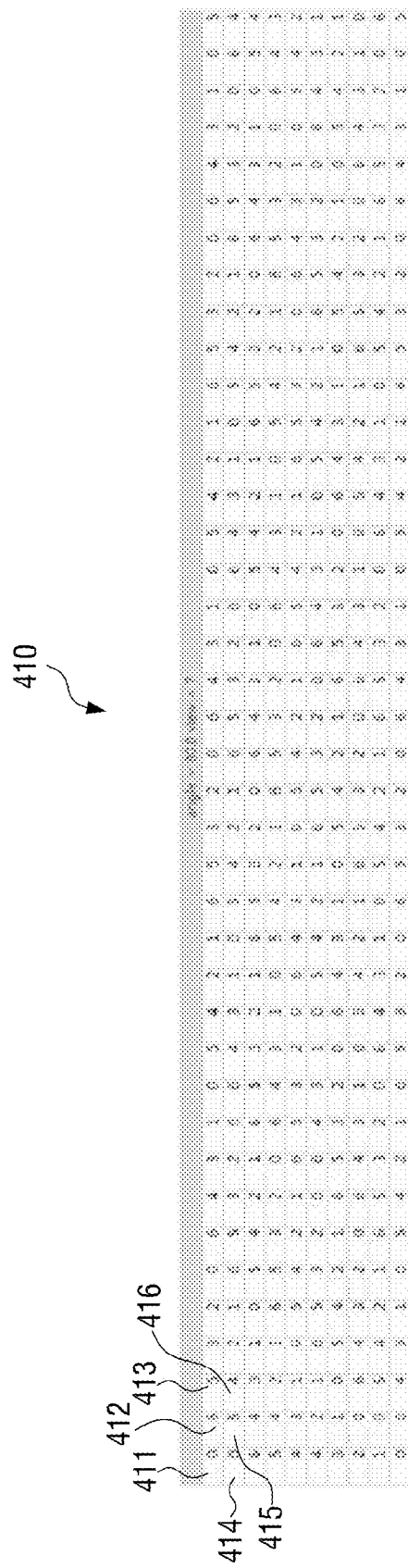

In such a case, the renderer 120 may render the multi-view image 410 using seven viewpoint images, as illustrated in FIG. 4A.

For example, in the case of R, G, and B sub pixels constituting a first pixel, the renderer 120 may render a multi-view image 410 in which an R sub pixel of line 1 and row 2 of a 0th viewpoint is displayed on an R sub pixel 411 of line 1 and row 1 of the display panel 111, a G sub pixel of line 1 and row 2 of a sixth viewpoint view is displayed on a G sub pixel 412 of line 1 and row 2 of the display panel 111, and a B sub pixel of line 1 and row 3 of a fifth viewpoint image is displayed on a B sub pixel 413 of line 1 and row 3 of the display panel 111.

Furthermore, in the case of R, G, and B sub pixels constituting a pixel right below the first pixel, the renderer 120 may render the multi-view image 410 in which an R sub pixel of line 2 and row 1 of a 0th viewpoint image is displayed on an R sub pixel 414 of line 2 and row 1 of the display panel 111, and a G sub pixel of line 2 and row 2 of a fifth viewpoint image is displayed on a G sub pixel 415 of line 2 and row 1 of the display panel 111, and a B sub pixel of line 2 and row 3 of a fourth viewpoint image is displayed on a B sub pixel 416 of line 2 and row 3 of the display panel 111.

Although not described specifically, for the rest of the sub pixels the renderer 120 may render the multi-view image 410 such that each sub pixel of the seven viewpoint images is displayed on each sub pixel of the display panel 111 in the same manner as in FIG. 4A.

In another example, the renderer 120 may render the multi-view image 440 using seven viewpoint images as illustrated in FIG. 4B.

For example, in the case of R, G, and B sub pixels constituting a first pixel, the renderer 120 may render the multi-view image 420 in which an R sub pixel of line 1 and row 1 of a first viewpoint image is displayed on an R sub pixel 421 of line 1 and row 1 of the display panel 111, a G sub pixel of line 1 and row 2 of a 0th viewpoint image is displayed on a G sub pixel 422 of line 1 and row 2 of the display panel 111, and a B sub pixel of line 1 and row 3 of a second viewpoint image is displayed on a B sub pixel 423 of line 1 and row 3 of the display panel 111.

Furthermore, in the case of an R, G, and B sub pixels constituting a pixel right below the first pixel, the renderer 120 may render the multi-view 420 where an R sub pixel of line 2 and row 1 of a first viewpoint image is displayed on an R sub pixel 424 of line 2 and row 1 of the display panel 111, a G sub pixel of line 2 and row 2 of a second viewpoint image is displayed on a G sub pixel of line 2 and row 1 of the display panel 111, and a B sub pixel of line 2 and row 3 of a fourth viewpoint image is displayed on a B sub pixel 426 of line 2 and row 3 of the display panel 111.

Although not described specifically, the renderer 120 may render the multi-view image 420 such that each sub pixel of the seven viewpoint images is displayed on each of the remaining sub pixels of the display panel 111 in the manner illustrated in FIG. 4B.

Accordingly, the seven viewpoint images constituting the multi-view images 430 and 444 may be refracted by different angles by the lenticular lens (not illustrated), and each of the seven viewpoint images: the 0th viewpoint image, first viewpoint image, second viewpoint image, third viewpoint image, fourth viewpoint image, fifth viewpoint image, and sixth viewpoint image may be focused on each of the seven viewing areas, thus forming seven optical views.

In the aforementioned example, the width of each lens is 4.6 sub pixels, however it should be appreciated that the width of each lens may vary.

In the aforementioned example, the lenticular lens (not illustrated) is tilted by 80°, however it should be appreciated that the lenticular lens (not illustrated) may be tilted by any of various angles when the cover 200 is closed without any twisting. The renderer 120 may render the multi-view image correspondingly.

In the aforementioned example, the stereoscopic image filter is embodied as a lenticular lens (not illustrated). However it should be appreciated that the stereoscopic image filter may vary. For example, in other embodiments, the stereoscopic image filter may be embodied as a parallax barrier (not illustrated).

As the display apparatus 100 provides a stereoscopic image to a user through the transparent area 210 when the cover 200 is closed, the sub pixels illustrated in FIG. 4A and FIG. 4B are at least a portion of the sub pixels existing on the area on the display 110 corresponding to the transparent area 210 when the cover 200 is closed. That is, the renderer 120 may render the multi-view image on the sub pixel corresponding to the area of the display 110 corresponding to the transparent area 210 when the cover 200 is closed.

The controller 130 controls overall operations of the display apparatus 100. For this purpose, the controller 130 may include RAM (Random Access Memory) and ROM (Read Only Memory) for operations of a micom (or, CPU (Central Processing Unit)) and display apparatus 100. These modules may be embodied in an SoC (System on Chip) format.

The controller 130 may control the renderer 120 to render a multi-view image. That is, the controller 130 may control the renderer to render the multi-view image corresponding to the transparent area 210 when the cover 200 is closed.

For this purpose, the controller 130 may determine whether the cover 200 fitted to the display apparatus 100 is currently open or closed.

For example, when the cover 200 is closed, a magnetic hole sensor (not illustrated) may be provided near the display 110. The magnetic hole sensor may sense a magnet provided on a part of the cover 200 that covers the display 110, and output a sensor data signal to the controller 130. Accordingly, in response to the sensing data being output from the magnet hole sensor (not illustrated), the controller 130 may determine that the cover 200 is closed.

The magnetic hole sensor is only one exemplary sensor. Thus, any sensing technology may be applied without limitation, as long as it is able to sense whether or not the cover 200 is opened/closed.

When the cover 200 is closed, the controller 130 may control the multi-view image to be displayed on an area of the display 110 corresponding to the transparent area 210.

That is, when the cover 200 is closed, the display apparatus 100 may reference stored information indicating the area of the display 110 corresponding to the size and location of the transparent area 210. The controller 130 may control the renderer 120 to render the multi-view image on a sub pixel of the display 110 corresponding to the transparent area 210, and thereby display the rendered multi-view image on the corresponding area.

The cover 200 may be closed without any twisting as illustrated in FIG. 1B, or the cover 200 may be closed and twisted as illustrated in FIG. 1C.

When the cover 200 is closed and twisted, an angle of the stereoscopic image filter of the transparent area 210 and the vertical axis of the display 110 may be misaligned. Thus, if the multi-view image is rendered in the same manner as when the cover 200 is closed without any twisting, the user will not be provided with a high quality stereoscopic image.

Therefore, the controller 130 may control the renderer 120 to render the multi-view image based on the extent that the cover 200 is twisted.

That is, when the cover 200 is fitted to the display apparatus 100 and closed, the controller may determine the extent to which the closed cover 200 is twisted, control the renderer 120 to render the multi-view image corresponding to the extent of twisting, and display the rendered multi-view image on the display 110.

The controller 130 may determine the extent of twisting based on a point that a predetermined point of the cover 200 contacts the display 110. The controller 130 may then control the renderer to render the multi-view image corresponding to the extent of twisting.

That is, when the cover 200 is closed normally, without any twisting, a predetermined point on an inner surface of the cover, that is a surface that touches the display 110 when the cover 200 is closed, will touch a sub pixel (or pixel) having a particular coordinate on the display 110.

However, when the cover 200 is closed and twisted, the predetermined point will not touch the particular coordinate, but will touch a sub pixel (or pixel) having a different coordinate.

Therefore, the controller 130 may determine whether or not the cover 200 is closed and twisted by comparing the particular coordinate that is touched when the cover 200 is closed without any twisting, and the coordinate actually touched by the predetermined point of the cover 200. Thereafter, the controller 130 may control the renderer to render the multi-view image correspondingly when the cover 200 is twisted.

For this purpose, an electroconductive material may be attached to the predetermined point of the cover 200.

Figure 5:
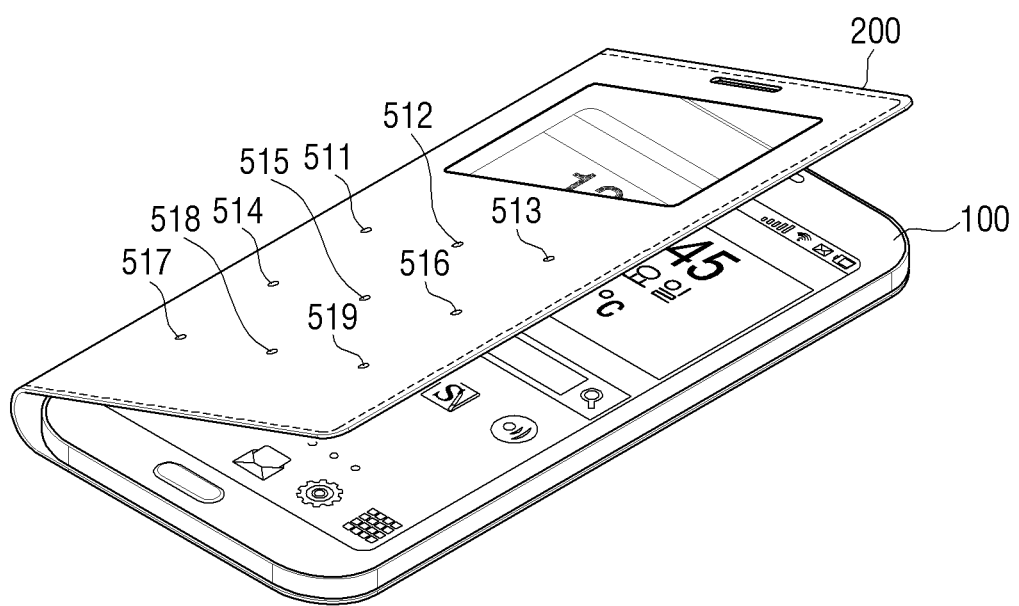
FIG. 5 illustrates a display apparatus and a cover including electroconductive material according to an exemplary embodiment.

For example, as illustrated in FIG. 5, on the inner side of the cover 200 that touches the display 100 when the cover 200 is closed, there may be an electroconductive material (511 to 518) attached. In this case, on the cover 200, at least three electrostatic materials may be arranged not parallel to one another.

Accordingly, in response to the cover 200 being closed, the electroconductive material (511 to 518) may touch the display 110, and the touch sensor 112 may sense the coordinate of the sub pixel touched by the electroconductive material (511 to 518).

The display apparatus 100 may store the particular coordinate corresponding to the coordinate of the sub pixel on the display 110 that is touched by the predetermined point of the cover 200 in response to the cover 200 being closed normally without any twisting.

Thus, in response to the cover 200 being closed, the controller 130 may determine whether or not the closed cover 200 is twisted by comparing the sub pixel coordinate sensed by the touch sensor 112 with the prestored sub pixel particular coordinate.

That is, in response to the sub pixel coordinate actually touched on the display 110 corresponding to the prestored sub pixel coordinate, it may be determined that the cover 200 is closed without any twisting, and in response to the sub pixel coordinate actually touched on the display 110 not corresponding to the prestored sub pixel coordinate, it may be determined that the cover 200 is closed and twisted.

Furthermore, the controller 130 may control the renderer to render the multi-view image based on an extent to which the cover 200 is twisted, and control the display 110 to display the rendered multi-view image.

Specifically, in response to the cover 200 being closed without any twisting, the controller 130 may control the renderer 120 to render the multi-view image in a corresponding manner. For example, in response to the cover 200 being closed without any twisting, the stereoscopic image filter of the transparent area 210 may be tilted by 80° with respect to the display 110, in which case the controller 130 may control the renderer 120 to render the multi-view image as illustrated with reference to FIG. 4A, and the rendered multi-view image may be displayed on the display 110.

In response to a determination that the cover 200 is closed and twisted, the controller 130 may control the renderer 120 to render the multi-view image based on the extent of twisting.

Specifically, the controller 130 may determine the sub pixel coordinate of the point on the display 110 touched by the predetermined point of the closed cover 200, calculate a modifying parameter representing an extent of rotation and extent of movement of the position of the sub pixel coordinate of the touched point based on the sub pixel coordinate, and control the renderer 120 to render the multi-view image based on the calculated modifying parameter.

In this case, the controller 130 may calculate the modifying parameter using a value calculated based on math formula 1 below.

$$e(R, t) = \frac{1}{n} \sum \|q_i - (Rp_i + t)\|^2 \quad \text{[Math formula 1]}$$

Herein, $q_i$ is the predetermined sub pixel coordinate having index i, R is the extent of rotation, $p_i$ is the sub pixel coordinate of the touched point having index i, t is the extent of movement, and n is the number of predetermined sub pixels or sub pixels of the touched point.

In this case, R, representing the extent of rotation, has θ as a parameter, and may be expressed as $$\begin{pmatrix} \cos\theta & \sin\theta \\ -\sin\theta & \cos\theta \end{pmatrix}.$$

Furthermore, t, representing the extent of movement, has sub pixel values $t_x$, $t_y$ representing the line direction and row direction, respectively, and may be expressed as $(t_x, t_y)$.

Accordingly, e(R, t), in math formula 1, refers to an average of a square of a distance between the sensed sub pixel coordinate, $p_i$ rotated by θ and moved by $(t_x, t_y)$, and the prestored particular sub pixel coordinate.

Therefore, θ and $(t_x, t_y)$ that minimize the e(R, t) are values by which the sensed pixel coordinate, $p_i$ must be rotated and moved in order to approximate the sub pixel coordinate that should have been touched, $q_i$, and thus θ and $t_x$, $t_y$ may represent the extent by which the cover 200 is rotated and moved from where the cover 200 is normally closed without any twisting.

That is, θ may represent the angle rotated from where the cover 200 is normally closed without twisting, and $(t_x, t_y)$ may represent the sub pixel value moved in the line direction and row direction from where the cover 200 is normally closed without twisting.

Therefore, in order to determine the extent the cover 200 is twisted, the controller 130 may calculate e(R, t) based on math formula 1, and calculate θ and $(t_x, t_y)$ that could minimize the e(R, t).

Specifically, the controller 130 may calculate θ and t that could minimize e(R, t) by calculating a value of θ for which the partial differential of e(R, t) based on θ would be 0, calculate a value of $t_x$ for which the partial differential of e(R, t) based on $t_x$ would be 0, and calculate a value of $t_y$ for which the partial differential of e(R, t) based on $t_y$ would be 0.

In this case, the calculated θ and $(t_x, t_y)$ represent the extent by which the cover 200 is rotated and moved, and thus, using θ and $(t_x, t_y)$ as modifying parameters, the controller 130 may control such that a multi-view image corresponding to the extent by which the cover 200 is twisted may be generated.

Hereinafter, a method for calculating a modifying parameter based on math formula 1 will be discussed with reference to FIG. 6. For convenience, suppose that four electroconductive materials are provided in the cover 200 in FIG. 6.

Figure 6:
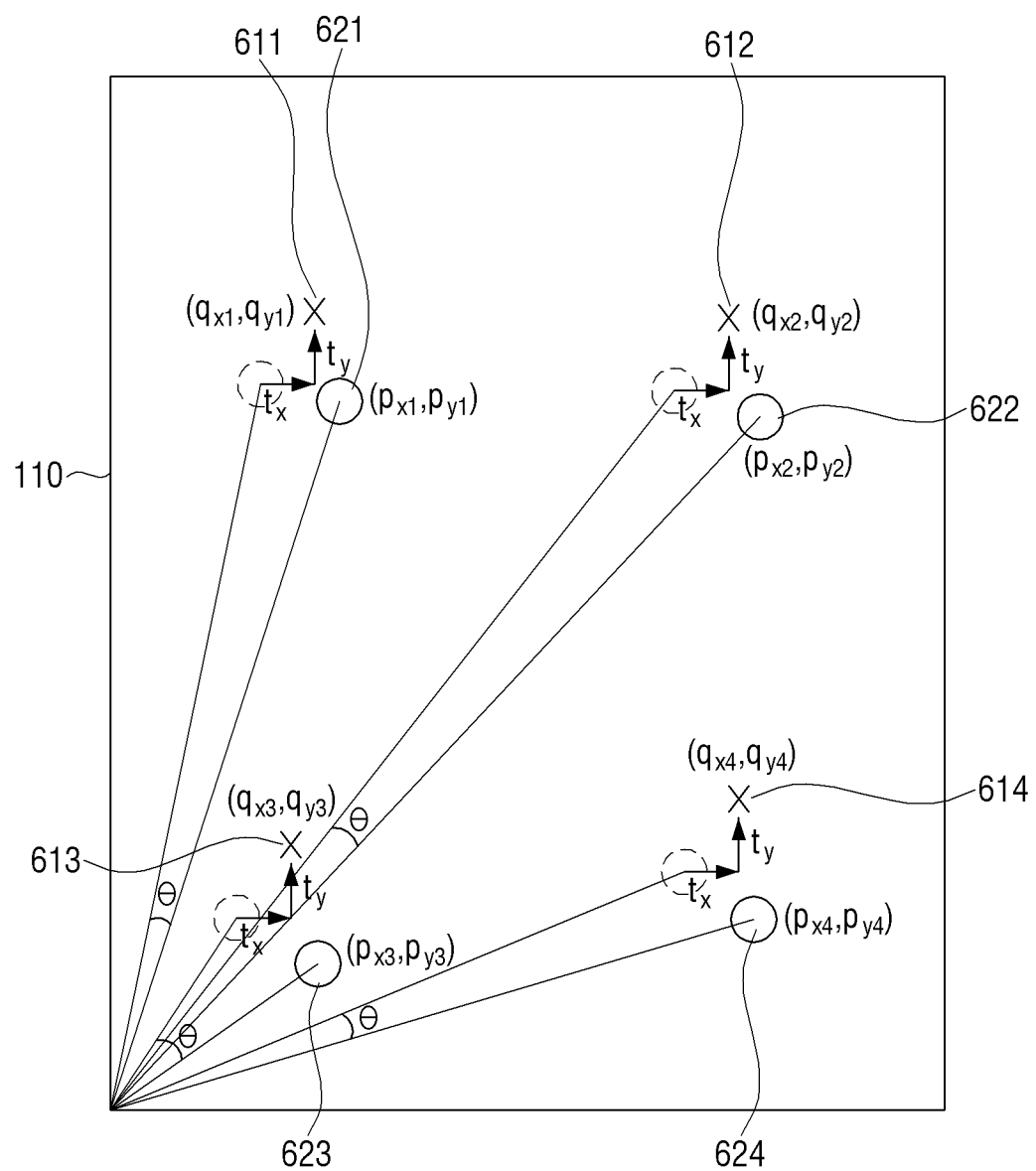
FIG. 6 illustrates relative positions of pixels of a display and electroconductive materials of a cover according to an exemplary embodiment.

In FIG. 6, coordinates of the sub pixels, $q_1$, $q_2$, $q_3$, $q_4$, on the display 110 that correspond to locations touched by the electroconductive materials of the cover 200, when the cover 200 is closed without any twisting, are represented by X, and each of the sub pixels has coordinates of $(qx_1, qy_1)$ 611, $(qx_2, qy_2)$ 612, $(qx_3, qy_3)$ 613, and $(qx_4, qy_4)$ 614.

Furthermore, coordinates of the sub pixels, $p_1, p_2, P_3, P_4$, on the display 110 touched by the electroconductive materials and sensed by the touch sensor 112 when the cover 200 is closed, are represented by o, and each of the sub pixels has coordinates of $(px_1, py_1)$ 621, $(px_2, py_2)$ 622, $(px_3, py_3)$ 623, and $(px_4, py_4)$ 624.

Herein, values of θ and $(t_x, t_y)$ that could minimize e(R, t) may be those that approximate to each of $(qx_1, qy_1)$ 611, $(qx_2, qy_2)$ 612, $(qx_3, qy_3)$ 613, and $(qx_4, qy_4)$ 614, when each of $(px_1, py_1)$ 621, $(px_2, py_2)$ 622, $(px_3, py_3)$ 623, and $(px_4, py_4)$ 624 is rotated by θ, and moved in the line direction by $t_x$ sub pixel, and moved in the row direction by $t_y$ sub pixel.

Therefore, the controller 130 may calculate the values of θ and $(t_x, t_y)$ that minimize e(R, t), and control the renderer to render the multi-view image corresponding to the extent of twisting of the cover 200 using the calculated values as modifying parameters.

A method for rendering the multi-view image when the cover 200 is closed will be discussed in further detail with reference to FIGS. 7A through 11B.

Specifically, the calculated θ refers to the extent the closed cover 200 is rotated from a position where the cover 200 is closed without any twisting. Thus, it is possible to determine that the stereoscopic image filter provided in the transparent area 210 is rotated by θ from the position where the cover 200 is closed without twisting, and control the multi-view image corresponding thereto.

For this purpose, the display apparatus 100 may prestore information on the angle by which the stereoscopic image filter is tilted and on the viewpoint image being displayed on each sub pixel. Using this information, the renderer 120 may render the multi-view image based on the tilted angle of the stereoscopic filter when the cover 200 is closed and twisted.

For example, as discussed above with reference to FIG. 4, suppose the lenticular lens (not illustrated) provided in the transparent area 210 is tilted by 80° when the cover 200 is closed normally, without any twisting.

In response to a calculated θ, based on math formula 1, being 5°, the controller 130 may determine that the lenticular lens (not illustrated) provided in the transparent area 210 is currently tilted by 85°, and thereafter control the renderer 120 to render the multi-view image based on the determined angle.

Figure 7A:
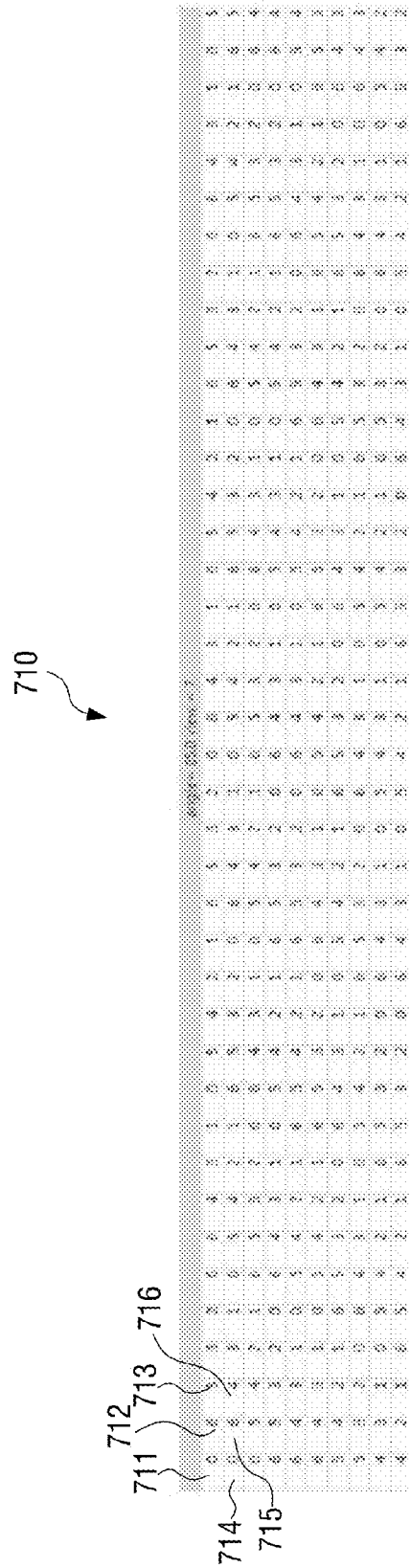

In this case, the renderer 120 may render the multi-view image 710 using the viewpoint image as illustrated in FIG. 7A.

For example, in the case of R, G, and B sub pixels constituting a first pixel, the renderer 120 may render a multi-view image 710 in which an R sub pixel of line 1 and row 1 of a 0th viewpoint view is displayed on an R sub pixel 711 of line 1 and row 1 of the display panel 111, and a G sub pixel of line 1 and row 2 of a sixth viewpoint image is displayed on a G sub pixel 712 of line 1 and row 2 of the display panel 111, and a B sub pixel of line 1 and row 3 of a fifth viewpoint image is displayed on a B sub pixel 713 of line 1 and row 3 of the display panel 111.

Furthermore, in the case of R, G, and B sub pixels constituting a pixel right below the first pixel, the renderer 120 may render the multi-view image 710 in which an R sub pixel of line 2 and row 1 of a 0th viewpoint image is displayed on an R sub pixel 714 of line 2 and row 1 of the display panel 111, a G sub pixel of line 2 and row 2 of a sixth viewpoint image is displayed on a G sub pixel 715 of line 2 and row 1 of the display panel 111, and a B sub pixel of line 2 and row 3 of a fourth viewpoint image is displayed on a B sub pixel 716 of line 2 and row 3 of the display panel 111.

Although not described specifically, for the remaining sub pixels, the renderer 120 may render the multi-view image 710 such that each sub pixel of the seven viewpoint images is displayed on each sub pixel of the display panel 111 in the same manner as in FIG. 7A.

In another example, the renderer 120 may render the multi-view image 740 using seven viewpoint images as illustrated in FIG. 7B.

For example, in the case of R, G, and B sub pixels constituting a first pixel, the renderer 120 may render the multi-view image 720 in which an R sub pixel of line 1 and row 1 of a first viewpoint image is displayed on an R sub pixel 721 of line 1 and row 1 of the display panel 111, a G sub pixel of line 1 and row 2 of a 0th viewpoint image is displayed on a G sub pixel 722 of line 1 and row 2 of the display panel 111, and a B sub pixel of line 1 and row 3 of a second viewpoint image is displayed on a B sub pixel 723 of line 1 and row 3 of the display panel 111.

Furthermore, in the case of an R, G, and B sub pixels constituting a pixel right below the first pixel, the renderer 120 may render the multi-view 720 in which an R sub pixel of line 2 and row 1 of a first viewpoint image is displayed on an R sub pixel 724 of line 2 and row 1 of the display panel 111, a G sub pixel of line 2 and row 2 of a 0th viewpoint image is displayed on a G sub pixel 725 of line 2 and row 1 of the display panel 111, and a B sub pixel of line 2 and row 3 of a fourth viewpoint image is displayed on a B sub pixel 726 of line 2 and row 3 of the display panel 111.

Although not described specifically, for the remaining sub pixels, the renderer 120 may render the multi-view image 420 such that each sub pixel of the seven viewpoint images is displayed on each sub pixel of the display panel 111 in the same manner as in FIG. 7B.

In such a case, each of the seven viewpoints constituting the multi-view images 710 and 720 may be refracted by a lenticular lens (not illustrated) by different angles. Thus, of the seven viewpoint views, 0th viewpoint image, first viewpoint image, second viewpoint image, third viewpoint image, fourth viewpoint image, fifth viewpoint image, and sixth viewpoint image may be focused on each of the seven viewing area, thereby forming seven optical views.

In this case, since the multi-view image 710 illustrated in FIG. 7A represents a case of tilting 5° from the position of FIG. 4A, the seven optical views in FIG. 7A may form a linear format, and since the multi-view image 720 illustrated in FIG. 7B represents a case of tilting 5° from the position of FIG. 4B, the seven optical views of FIG. 7B may form a cyclic format.

In the aforementioned example, θ was 5°, but since the angle of rotation of the cover 200 may vary, the angle by which the lenticular lens (not illustrated) provided in the transparent area 210 is rotated may vary accordingly, and the controller 130 may control the renderer to render the multi-view image corresponding thereto.

Figure 8A:
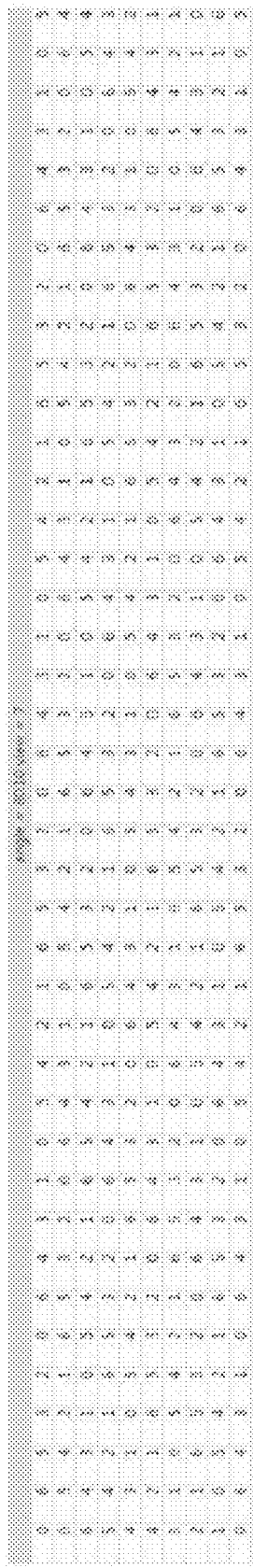
Figure 8B:
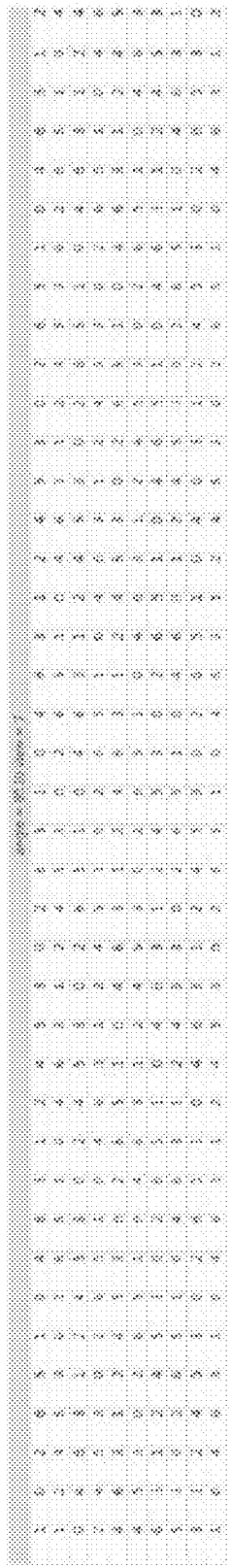

For example, when a calculated θ, based on math formula 1 is 0.1°, and the lenticular lens (not illustrated) is tilted by 80.1°, the rendered multi-view image may be the same as in FIG. 8A and FIG. 8B. In this case, FIG. 8A and FIG. 8B may be the multi-view images rendered to correspond to the angle rotated from FIG. 4A and FIG. 4B, respectively.

Figure 9A:
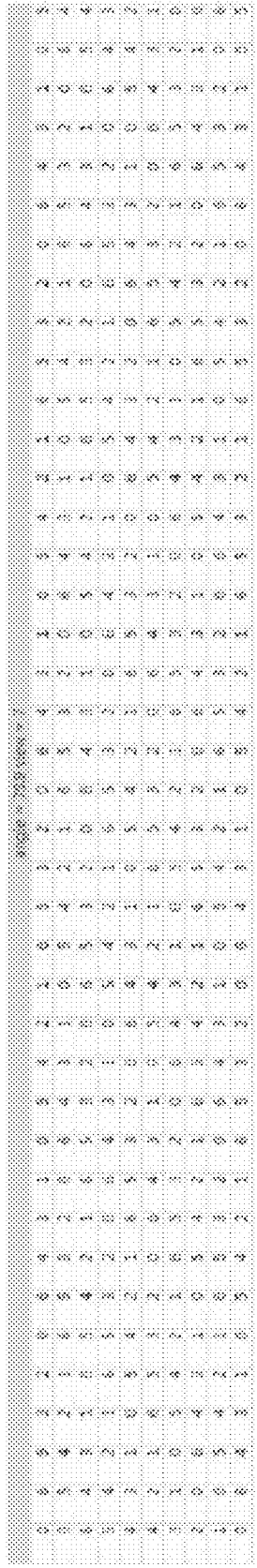
Figure 9B:
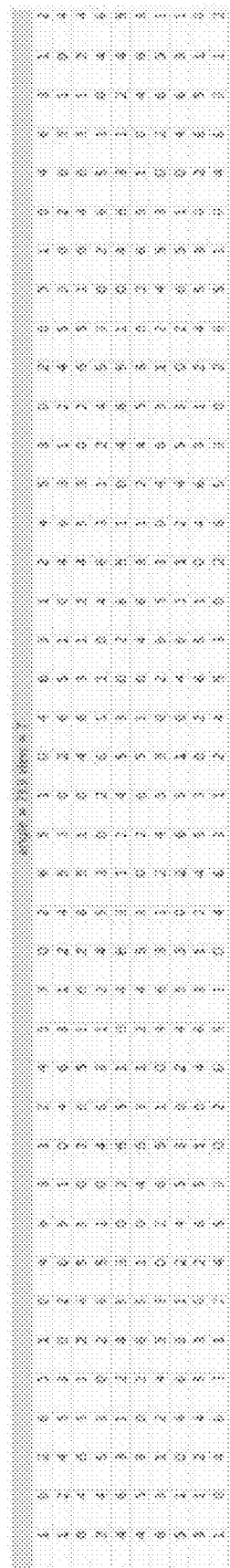

In another example, when a calculated θ, based on math formula 1, is −0.1°, and the lenticular lens (not illustrated) is tilted by 79.9°, the rendered multi-view image may be the same as in FIG. 9A and FIG. 9B. In this case, FIG. 9A and FIG. 9B may be the multi-view images rendered to correspond to the angle rotated from FIG. 4A and FIG. 4B, respectively.

Figure 10A:
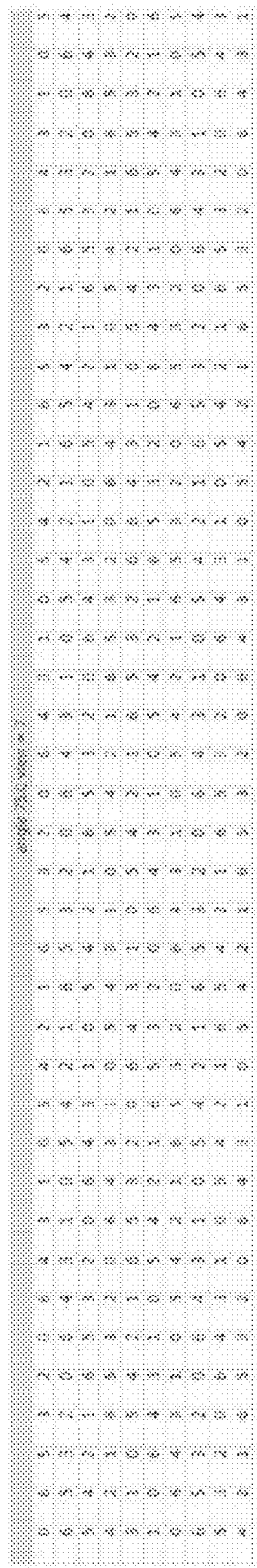
Figure 10B:
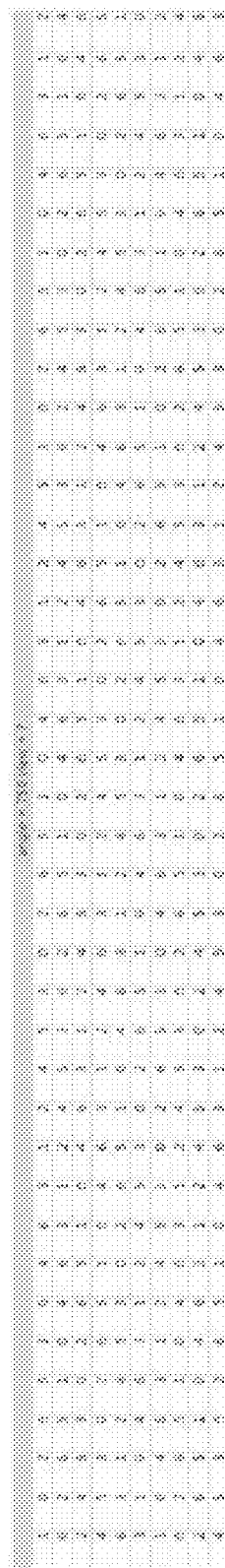

In another example, when a calculated θ, based on math formula 1, is −5°, and the lenticular lens (not illustrated) is tilted by 75°, the rendered multi-view image may be the same as in FIG. 10A and FIG. 10B. In this case, FIG. 10A and FIG. 10B may be the multi-view images rendered to correspond to the angle rotated from FIG. 4A and FIG. 4B, respectively.

Since the calculated $t_x$, $t_y$ represent the extent by which the cover 200 is moved from where the cover 200 is closed normally without any twisting, the controller 130 may determine that the stereoscopic image filter provided in the transparent area 210 is moved to the right by $t_x$ sub pixel(s), and to down by $t_y$ sub pixel(s), and render the multi-view image corresponding thereto.

For example, suppose θ and $t_x$, $t_y$, are calculated based on math formula 1 as 5° and 2, 2, respectively. In this case, the controller may determine that the lenticular lens (not illustrated) provided in the tilted transparent area 210 is tilted by 85°, and moved to the right 2 sub pixels, and down by 2 sub pixels. The controller may then control the renderer 120 to render the multi-view image corresponding thereto.

Figure 11A:
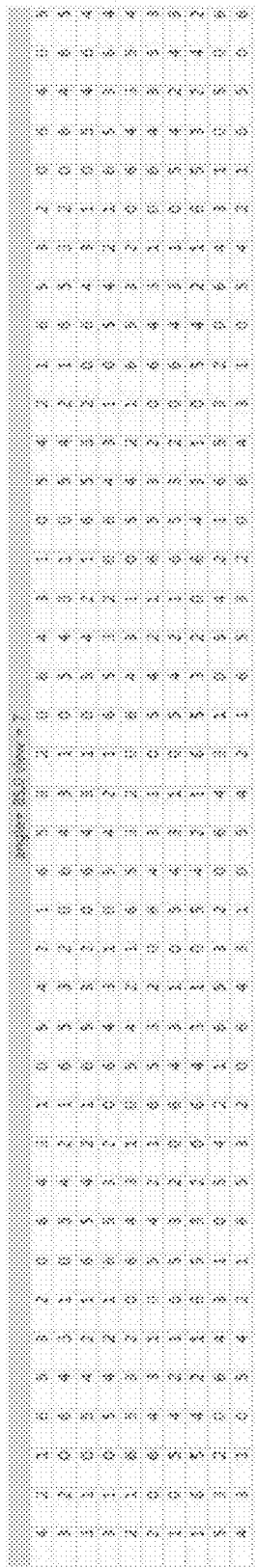
Figure 11B:
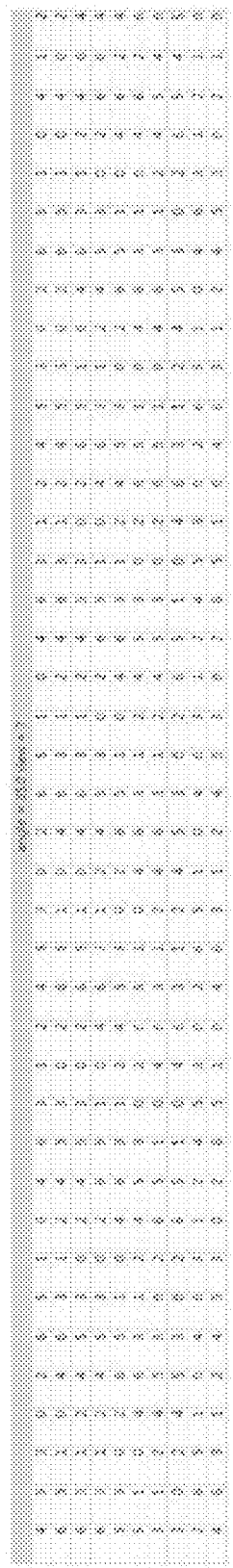

In this case, as illustrated in FIGS. 11A and 11B, the renderer 120 may render the multi-view image 110, that is the multi-view image 710 moved to the left by 2 sub pixels and moved up by 2 sub pixels as illustrated in FIGS. 7A and 7B.

In the aforementioned example, (tx, ty) was (2, 2), but this is just an example, and the extent by which the cover 200 is moved may vary, and the controller 130 may control the renderer to render the multi-view by moving it by as many sub pixels as necessary.

The controller 130 may determine the extent by which the cover 200 is twisted at certain time periods.

That is, the controller 130 may control the renderer to render the multi-view image corresponding to the extent of twisting of the cover 200 in response to the cover 200 being closed. Furthermore, the controller 130 may determine the extent by which the cover 200 is twisted at periodic intervals after the cover 200 is closed, and control the renderer to render the multi-view image based on the determined result.

For example, in response to a determination that the cover 200 is twisted by 85° at the time that the cover is closed, the controller may control the renderer to render the multi-view image as illustrated in FIG. 7A or FIG. 7B. In response to a determination that the cover 200 is twisted by 80.1° after a certain period of time has passed, the controller may then control the renderer to render the multi-view image as in FIG. 8A or FIG. 8B.

In the aforementioned example, the controller 130 may determine the extent by which the cover 200 is twisted in a periodic manner. However, it should be appreciated that the controller 130 may determine the extent by which the cover 200 is twisted every time the twisting changes, and thereafter control the renderer to render the multi-view image corresponding on the newest determination, and display the rendered multi-view image.

That is, in response to the predetermined point of the cover 200 touching the display 110 in a new location, the sub pixel coordinate sensed in the touch sensor 112 may change. Accordingly, the controller 130 may determine the extent by which the cover 200 is twisted every time a change in the twisting of the cover 200 is sensed. That is, every time the sub pixel coordinate sensed in the touch sensor 112 changes, the controller may control the renderer to render the multi-view image corresponding to the newest determination, and display the rendered multi-view image.

According to an aspect of another exemplary embodiment the display apparatus 100 and cover 200 may be provided with additional connecting means for limiting the twisting of the cover 200.

For example, on the front surface of the display apparatus 100, there may be a connecting projection, and on the part of the cover 200 covering the front surface of the display apparatus 100, there may be a connecting groove to which the connecting projection of the display apparatus 100 may be inserted Accordingly, when the cover 200 is closed, the connecting projection may be inserted into the connecting groove, thus limiting the twist of the cover 200 when closed.

However, due to the size of the connecting projection and connecting groove, there may be situations in which the cover 200 is closed and twisted, even when the connecting projection is inserted into the connecting groove. In this case, the display apparatus 100 may render the multi-view image based on the extent the cover 200 is twisted, and display the rendered multi-view image.

Figure 12:
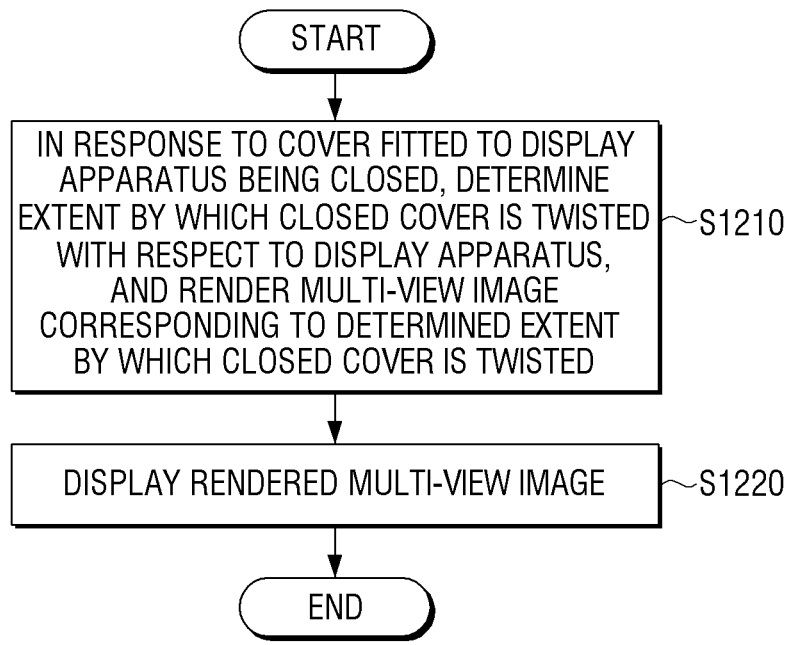
FIG. 12 is a flowchart illustrating a method for providing a multi-view image according to an exemplary embodiment.

FIG. 12 is a flowchart illustrating a method for providing a multi-view image according to an exemplary embodiment.

When the cover is closed, the extent by which the cover is twisted with respect to the display apparatus may be determined, and the multi-view image corresponding to the extent of twisting may be rendered (S1210).

Then, the rendered multi-view image may be displayed (S1220).

S1210 may involve determining the extent by which the cover is twisted based on the point touched by the predetermined point on the closed cover, and rendering the multi-view image based on the determined extent of twisting.

Specifically, the coordinate of the touched point on the display apparatus touched by the predetermined point on the closed cover may be determined, and the modifying parameter that represents the extent of rotation and movement may be calculated, and the multi-view image corresponding to the determined extent of twisting may be rendered based on the calculated modifying parameter.

In this case, the modifying parameter may be calculated based on the value calculated using the aforementioned math formula 1.

According to an aspect of another exemplary embodiment, the cover may be provided with a lenticular lens or parallax barrier in the predetermined area in order to separate the multi-view image into a plurality of images of different viewpoints.

Figure 13:
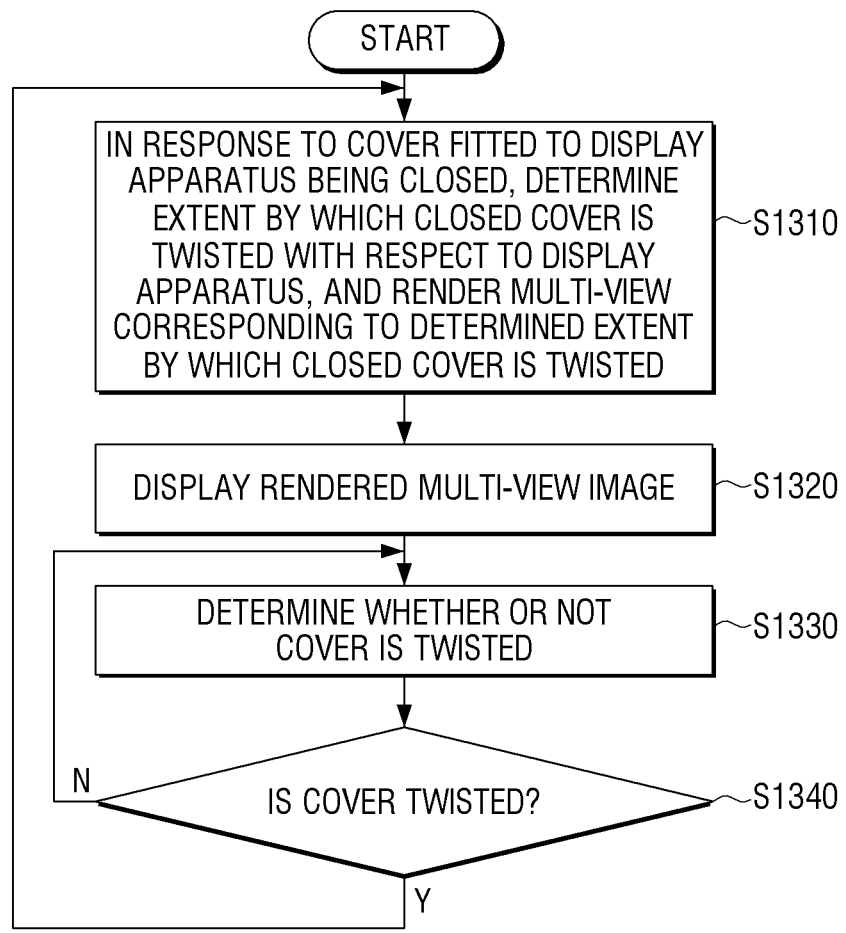
FIG. 13 is a flowchart illustrating a method for providing a multi-view image according to an exemplary embodiment.

FIG. 13 is a flowchart illustrating a method for providing a multi-view image according to an exemplary embodiment.

In response to the cover fitted to the display apparatus being closed, the extent by which the closed cover is twisted with respect to the display apparatus may be determined, and the multi-view image corresponding to the extent of twisting may be rendered (S1310).

Then, the rendered multi-view image may be displayed (S1320).

In this case, S1310 and S1320 are the same as the aforementioned S1210 and S1220, and thus detailed discussion is omitted.

Furthermore, whether or not the cover is twisted may be determined (S1330), and when it is determined that the cover is twisted (S1340-Y), S1310 and S1320 may be performed again.

That is, since the cover 200 may be twisted and then again be twisted to another shape, the extent to which the cover 200 is twisted may be determined at predetermined time intervals, or every time the extent of twisting changes. The multi-view image corresponding thereto may then be rendered and displayed.

There may be further provided a non-transitory computer readable medium for storing a program configured to sequentially perform a method for providing a multi-view image according to an exemplary embodiment.

A non-transitory computer readable medium refers to a computer readable medium configured to store data semi-permanently, not a medium that stores data for a short period of time such as a resistor, cache, and so forth. For example, various applications or programs may be stored in a non-transitory computer readable medium such as a Compact Disc (CD), Digital Video Disc (DVD), hard disk, blue ray disk, Universal Serial Bus (USB), memory card, and Read Only Memory (ROM).

Furthermore, although a bus is not illustrated in the aforementioned block diagram of the display apparatus, communication between each component of the display apparatus may be made through a bus. Furthermore, the display apparatus may further include a processor such as a Central Processing Unit (CPU) and/or a microprocessor configured to perform the aforementioned steps.

While multiple exemplary embodiments have been illustrated and described, it is understood by those skilled in the art that various changes in form and details may be made therein without departing from the principles and spirit of the disclosure, as defined by the following claims and their equivalents.

What is claimed is:

1. A display apparatus configured to be detachable from a cover, the display apparatus comprising:
    a display;
    a renderer configured to render a multi-view image; and
    a controller configured to, in response to the cover being closed, determine an extent by which the cover is twisted with respect to the display apparatus, control the renderer to render the multi-view image corresponding to the extent by which the closed cover is twisted, and control the display to display the rendered multi-view image,
    wherein the controller is further configured to determine a coordinate of a point on the display touched by a predetermined point of the cover and determine the extent by which the cover is twisted based on a degree of change of the coordinate of the touched point relative to a predetermined coordinate on the display.

2. The display apparatus according to claim 1,
    wherein the controller is further configured to determine a sub pixel coordinate of the point on the display touched by the predetermined point of the cover, to determine a modifying parameter representing an extent of rotation and an extent of movement of position of the sub pixel coordinate of the touched point based on a predetermined sub pixel coordinate, and to control the renderer to render the multi-view image corresponding to the extent by which the cover is twisted based on the determined modifying parameter.

3. The display apparatus according to claim 2,
    wherein the controller is further configured to determine the modifying parameter based on a math formula:

$$e(R, t) = \frac{1}{n}\sum \|q_i - (Rp_i + t)\|^2$$

wherein $q_i$ is the predetermined sub pixel coordinate having an index i, R is the extent of rotation, $p_i$ is the sub pixel coordinate of the touched point having index i, t is the extent of movement, and n is the number of predetermined sub pixels or sub pixels of the touched point.

4. The display apparatus according to claim 1,
    wherein the cover comprises one of a lenticular lens and parallax barrier in a predetermined area, configured to separate the multi-view image into a plurality of images of different viewpoints.

5. The display apparatus according to claim 1,
    wherein the controller determines the extent by which the cover is twisted periodically, at a predetermined time period.

6. A method for displaying a multi-view image on a display apparatus detachable from a cover, the method comprising:
    in response to the cover being closed, determining an extent by which the cover is twisted with respect to the display apparatus;
    rendering the multi-view image corresponding to the determined extent by which the cover is twisted; and
    displaying the rendered multi-view image,
    wherein the determining comprises determining a coordinate of a point on the display touched by a predetermined point of the cover and determining the extent by which the cover is twisted based on a degree of change of the coordinate of the touched point relative to a predetermined coordinate on the display.

7. The method according to claim 6, wherein the determining further comprises determining a sub pixel coordinate of the point on the display touched by the predetermined point of the cover, determining a modifying parameter representing an extent of rotation and movement of position of the sub pixel coordinate of the touched point based on a predetermined sub pixel coordinate, and
    the rendering further comprises rendering the multi-view image corresponding to the extent by which the cover is twisted based on the determined modifying parameter.

8. The method according to claim 7,
    wherein the rendering further comprises determining the modifying parameter based on a value determined based on a math formula:

$$e(R, t) = \frac{1}{n}\sum \|q_i - (Rp_i + t)\|^2$$

wherein $q_i$ is the predetermined sub pixel coordinate having an index i, R is the extent of rotation, $p_i$ is the sub pixel coordinate of the touched point having index i, t is the extent of movement, and n is the number of predetermined sub pixels or sub pixels of the touched point.

9. The method according to claim 6,
    wherein the cover comprises one of a lenticular lens and parallax barrier in a predetermined area, configured to separate the multi-view image into a plurality of images of different viewpoints.

10. The method according to claim 6, further comprising determining the extent by which the cover is twisted periodically at a predetermined time period.

11. A stereoscopic display method comprising:
   determining an orientation of a cover on a mobile device, the mobile device comprising a display;
   rendering, based on a result of the determining, a multi-view image on the mobile device; and
   displaying the rendered multi-view image on a portion of the display corresponding to a transparent area of the cover,
   wherein the determining the orientation of the cover comprises determining a coordinate of a point on the display touched by a predetermined point of the cover and determining an extent by which the cover is twisted based on a degree of change of the coordinate of the touched point relative to a predetermined coordinate on the display.

12. The stereoscopic display method of claim 11, wherein the determining of the orientation comprises:
   comparing a first detected reference point on the display with a first base reference point,
   wherein the first detected reference point corresponds to a location on the display touched by a predetermined point of the cover, and the first base reference point is a predetermined reference point corresponding to a location on the display touched by the predetermined point of the cover when the cover is in a known orientation.

13. The stereoscopic display method of claim 12, wherein the determining of the orientation further comprises:
   comparing a second detected reference point on the display with a second base reference point,
   wherein the second detected reference point corresponds to a location on the display actually touched by a second predetermined point of the cover, and the second base reference point corresponds to a location on the display touched by the second predetermined point of the cover when the cover is in a known orientation.

14. The stereoscopic display method of claim 11 wherein the determining comprises:
   determining a rotation of the cover; and
   determining a movement of the cover.

15. The stereoscopic display method of claim 11 wherein the multi-view image comprises seven viewpoint images.

16. A display apparatus comprising:
   a display;
   a cover configured to attach to the display, the cover comprising one of a lenticular lens and a parallax barrier disposed in a first region of the cover;
   a renderer configured to render a multi-view image; and
   a controller configured to determine an extent by which the cover is twisted with respect to the display and to control the renderer to render the multi-view image based on the extent by which the cover is twisted,
   wherein the controller is further configured to determine a coordinate of a point on the display touched by a predetermined point of the cover and determine the extent by which the cover is twisted based on a degree of change of the coordinate of the touched point relative to a predetermined coordinate on the display.

* * * * *